United States Patent [19]
Ingram

[11] Patent Number: 5,584,949
[45] Date of Patent: Dec. 17, 1996

[54] AIR INFLATION SYSTEM FOR TRAILER AXLES

[76] Inventor: Anthony L. Ingram, 9270 Marymont Park, San Antonio, Tex. 78217

[21] Appl. No.: 385,504

[22] Filed: Feb. 8, 1995

Related U.S. Application Data

[63] Continuation-in-part of Ser. No. 239,188, May 6, 1994, abandoned.

[51] Int. Cl.$^6$ ................................................. B60C 23/00
[52] U.S. Cl. .................. 152/417; 301/105.1; 301/108.1
[58] Field of Search .............................. 152/415, 416, 152/417; 180/339; 184/6.23; 188/264; 384/589; 301/5.24, 109, 110, 108.1, 105.1

[56] References Cited

U.S. PATENT DOCUMENTS

| | | | |
|---|---|---|---|
| 2,685,906 | 8/1954 | Williams | 152/417 |
| 3,144,099 | 8/1964 | Cadmus | 188/264 R |
| 3,276,503 | 10/1966 | Kilmarx | 152/417 |
| 3,336,998 | 8/1967 | Avrea | 180/339 |
| 4,249,783 | 2/1981 | Glassmeyer | 184/11.1 X |
| 4,636,007 | 1/1987 | Persons | 301/105.1 |
| 4,685,501 | 8/1987 | Williams | 152/417 |
| 4,784,500 | 11/1988 | Prokop | 384/462 |
| 4,883,106 | 11/1989 | Schultz et al. | 152/417 |
| 5,104,202 | 4/1992 | Branch | 384/485 X |
| 5,161,644 | 11/1992 | Swenskowski et al. | 180/339 X |
| 5,174,839 | 12/1992 | Schultz et al. | 152/415 |
| 5,287,906 | 2/1994 | Stech | 152/417 |
| 5,429,167 | 7/1995 | Jensen | 152/417 |

*Primary Examiner*—Michael W. Ball
*Assistant Examiner*—Francis J. Lorin
*Attorney, Agent, or Firm*—Fulbright & Jaworski L.L.P.

[57] ABSTRACT

An air control system having an air supply extending into the inside of the axles of a trailer to the tires. An air sealing barrier is connected adjacent each end of the axle for sealing air inside of the axle between the barriers. A pneumatic rotary union is positioned in each barrier and includes an air passageway in communication with the air inside of the axle and is connected to a rotatable air connection extending through a lubrication compartment at the end of the axle. An oil sight plug having a relief valve is connected to the lubrication compartment.

5 Claims, 5 Drawing Sheets

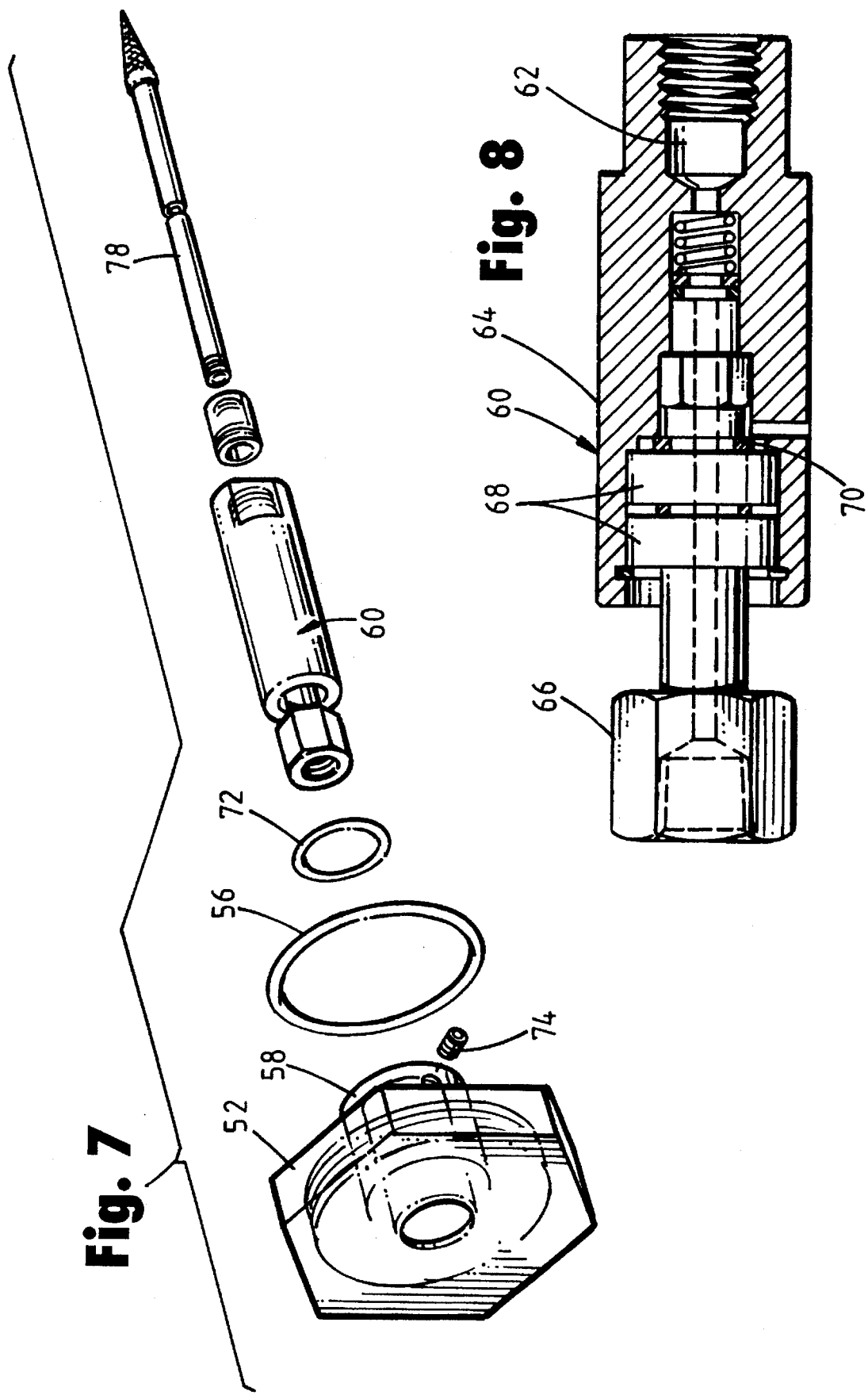

AIR INFLATION SYSTEM FOR TRAILER AXLES

Cross-Reference to Related Applications

This application is a continuation in part of application Ser. No. 08/239,188, filed May 6, 1994, entitled Air Control System for Pneumatic Tires on a Vehicle now abandoned.

BACKGROUND OF THE PRESENT INVENTION

The present invention is directed to an air control system for controlling the inflation pressures of tires on a trailer.

It is known, as disclosed in U.S. Pat. No. 5,287,906, to provide an automatic central tire inflation system (ATIS) in which the air in rotating tires is controlled through an air connection between the trailer air supply and each of the tires. The present invention is directed to an improved automatic tire inflation system.

Furthermore, most trailers are provided with a lubrication compartment at the end of the axle for containing lubricant for the wheel bearings. Such systems may include an oil sight glass and an oil plug for filling and inspecting the lubricant level in the lubricant compartment. In using an air inflation system, the air line may extend through the lubrication compartment. However, an inadvertent failure in the air control system, which is exposed to the oil filler plug, will blow out the oil filler plug and the lubricant with the consequential damage of burning out the bearings. Therefore, another feature of the present invention is the provision of a relief system for relieving any air pressure released in the air lubrication compartment for preventing the oil plug from being blown out.

SUMMARY

The present invention is directed to an air inflation system for a trailer having at least one axle with at least one wheel having a pneumatic tire at each end of the axle and the trailer having an air supply and a lubrication compartment at each end of the axle for lubricating the wheel bearings. The system includes an air conduit between the air supply and the axle supplying air and pressurizing the inside of the axle with air. An air sealing barrier is sealingly attached adjacent each end of the axle and positioned between the lubrication compartment and the pressurized air in the axle for sealing the air inside the axle between said sealing barriers. A pneumatic rotary union is positioned in each barrier and includes an air passageway extending through the union and in communication with the air inside of the axle. The union includes a first stationary part and a second rotatable part sealably rotatable relative to each other. The first stationary part is sealably secured to the air barrier and the second rotatable part is positioned exposed to the lubrication compartment. A rotatable air connection is connected between the second rotatable part and the tires and extends through the lubrication compartment. An oil sight plug having a relief valve is connected to the lubrication compartment.

The present invention further includes a hollow nipple connected to the stationary part and in communication with the air passage and extending into the axle. The nipple includes a free end and an air filter connected to the free end. Preferably, the free end is unsupported and free to vibrate thereby periodically cleaning the air filter.

A further object of the present invention is wherein the air sealing barrier is a threaded nut secured on the axle and includes a circular collar for receiving the rotary union and said collar includes a set screw for securing the union to the collar.

Yet a further object is wherein the air sealing barrier is a circular seal assembly positioned within the axle and an expandable retainer ring is positioned adjacent the seal assembly for gripping the inside of the axle and holding the wall in the axle.

Other and further objects, features and advantages will be apparent from the following description of presently preferred embodiments of the invention, given for the purpose of disclosure and taken in conjunction with the accompanying drawings.

BRIEF DESCRIPTION OF THE DRAWINGS

FIG. 7 is an exploded perspective elevational view of the portion of the air control system illustrated in FIG. 6, FIG. 8 is an enlarged elevational view, in cross section, of the rotary union of the present invention.

DESCRIPTION OF THE PREFERRED EMBODIMENT

Figure 1:
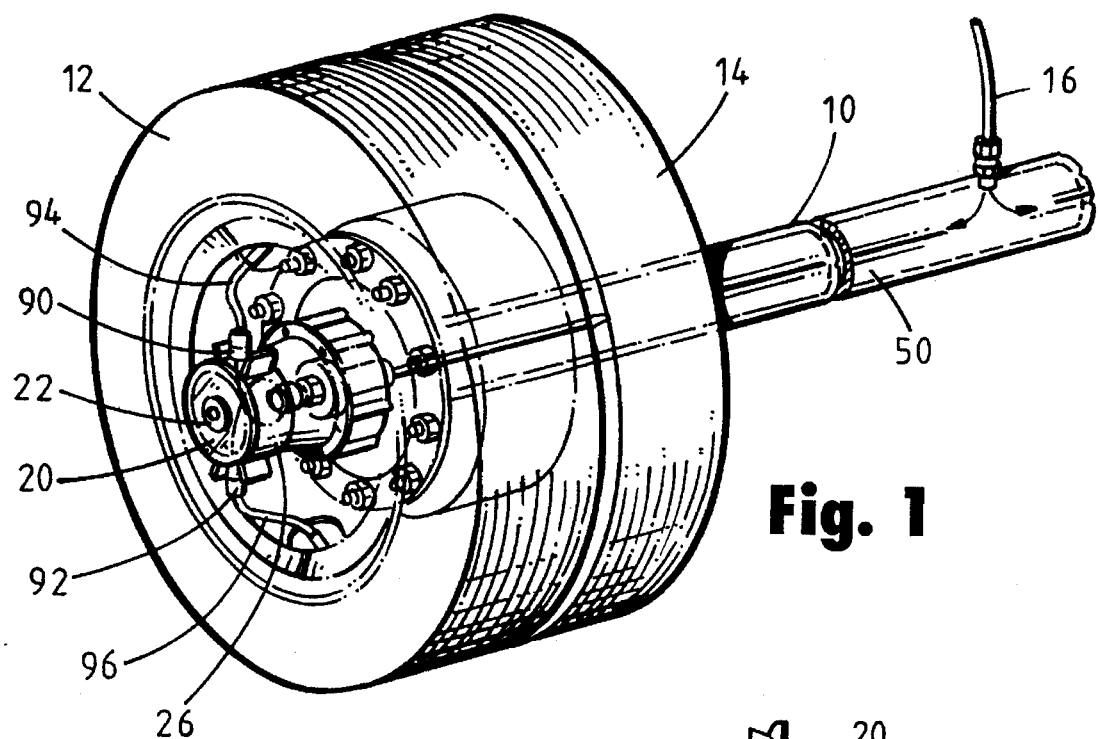
FIG. 1 is a fragmentary perspective elevational view of the improved air control system of the present invention connected to tires on a trailer.

Referring now to the drawings, and particularly to FIG. 1, the reference numeral 10 generally indicates one axle of a trailer having a plurality of axles with wheels having one or more tires such as tires 12 and 14 at one end. As is conventional, similar tires are at the second end of the axle 10 and such a vehicle includes an air supply line 16 from a compressor (not shown) for supplying air pressure to brakes on the vehicle, all as described in U.S. Pat. No. 5,287,906, which for a fuller disclosure is incorporated herein by reference.

The present invention is directed to providing an improved air control system for pneumatic tires on a vehicle which is continuously connected to the pneumatic tires on the trailer including tires 12 and 14 to provide equal pressure, to improve safety, and to provide even and improved life of expensive tires.

The present invention includes an air connection, which will be more fully described hereinafter, connected between the air supply line 16 and the tires 12 and 14 and extends through the axle 10.

Figure 4:
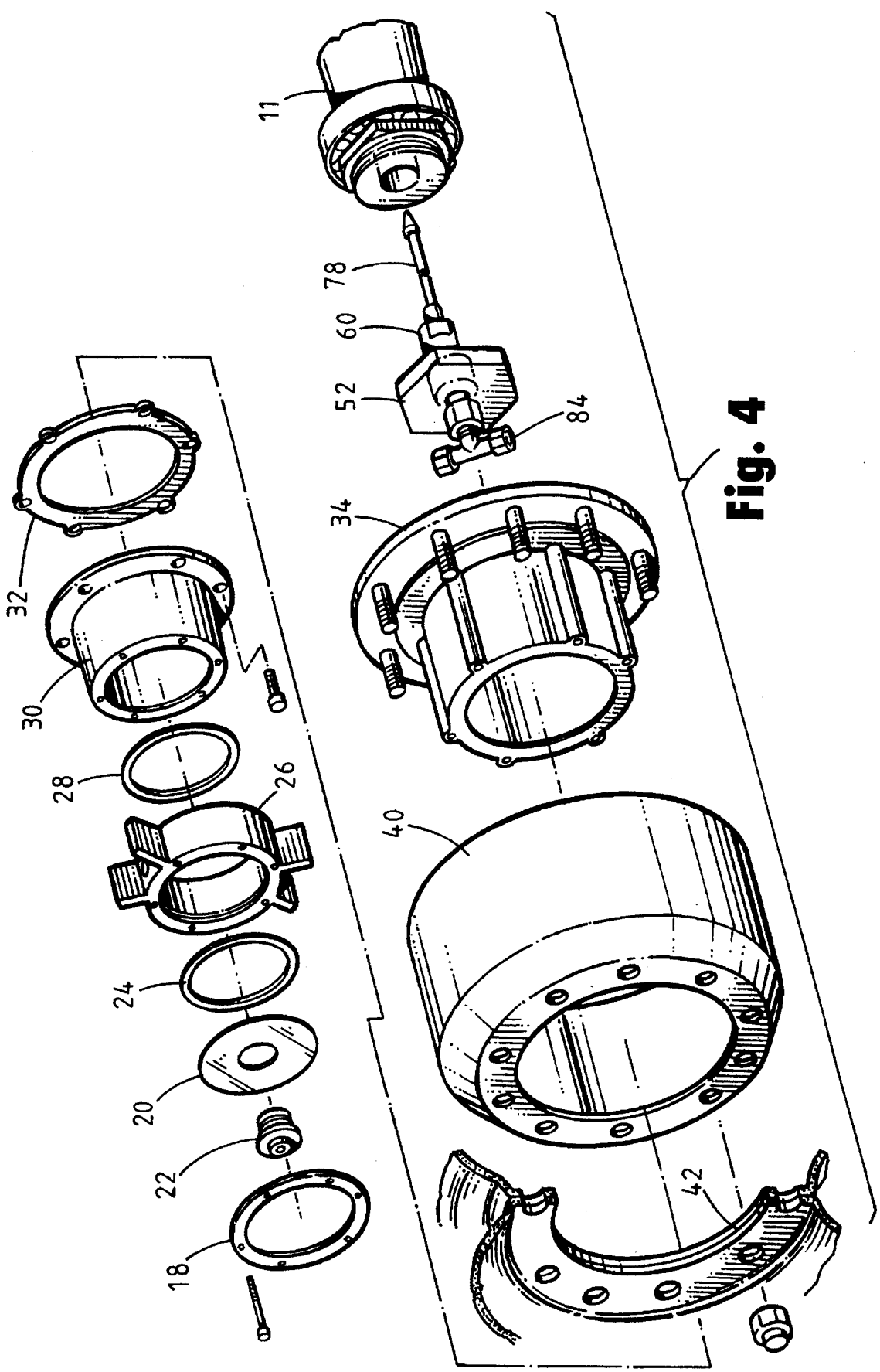
FIG. 4 is an enlarged fragmentary perspective elevational view, partly exploded and partly in cross section, illustrating part of the air control system of the present invention.
Figure 5:
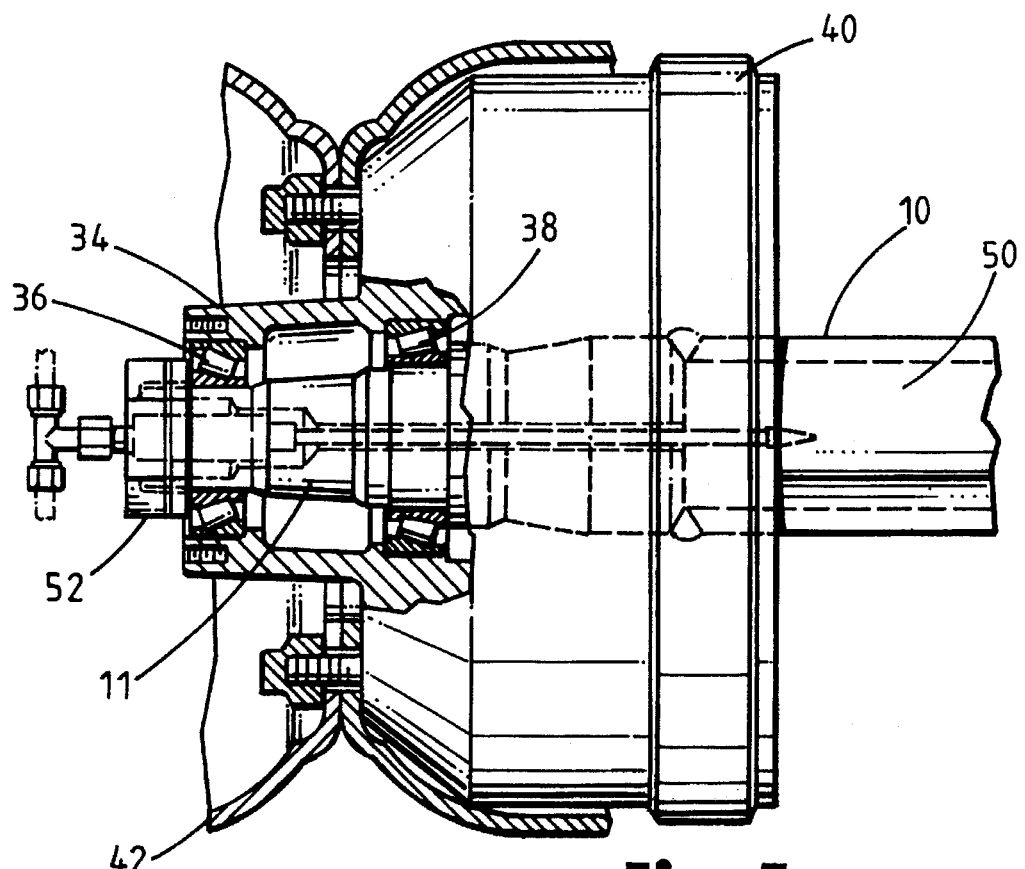
FIG. 5 is an enlarged fragmentary cross-sectional view of a part of the air connection of the present invention.

However, most trailers are provided with a lubrication compartment at each end of the axle 10 for containing lubricants for the wheel bearings. Referring now to FIGS. 1, 4 and 5, one type of lubrication compartment such as a STEMCO type is shown which includes a sight glass retainer 18, a sight glass 20 having a removable oil plug 22, a seal 24, a hubcap extension 26, an oil cap seal 28, a STEMCO type oil cap 30, and gasket 32.

As is conventional, a hub 34 rotates on bearings 36 and 38 on the axle 10 or the spindle 11 portion thereof and extends through a brake drum 40 and supports a tire and wheel assembly 42. The elements 18–32, form a lubrication compartment and are connected to the end of the hub 34. The lubricant level in the compartment may be observed through the sight glass 20 for insuring that proper lubrication is available for the bearings 36 and 38. The oil plug 22 may be removed when required to add additional lubricant to the compartment.

The passage of an air connection through the lubrication compartment from the air supply line 16 to the tires 12 and 14 creates the possibility that an air leak in the air connection, which may have a pressure of 110 psi, could blow out the oil plug 22, resulting in the loss of oil from the wheel bearings 36 and 38 with their consequential failure and expensive damage. In addition, prior air type air control systems, in which an air conduit extends coaxially through the axle 10, increases the possibility of failure and an air leak in the air control system as trailers are subject to harsh treatment, vibration and rugged environments.

Figure 6:
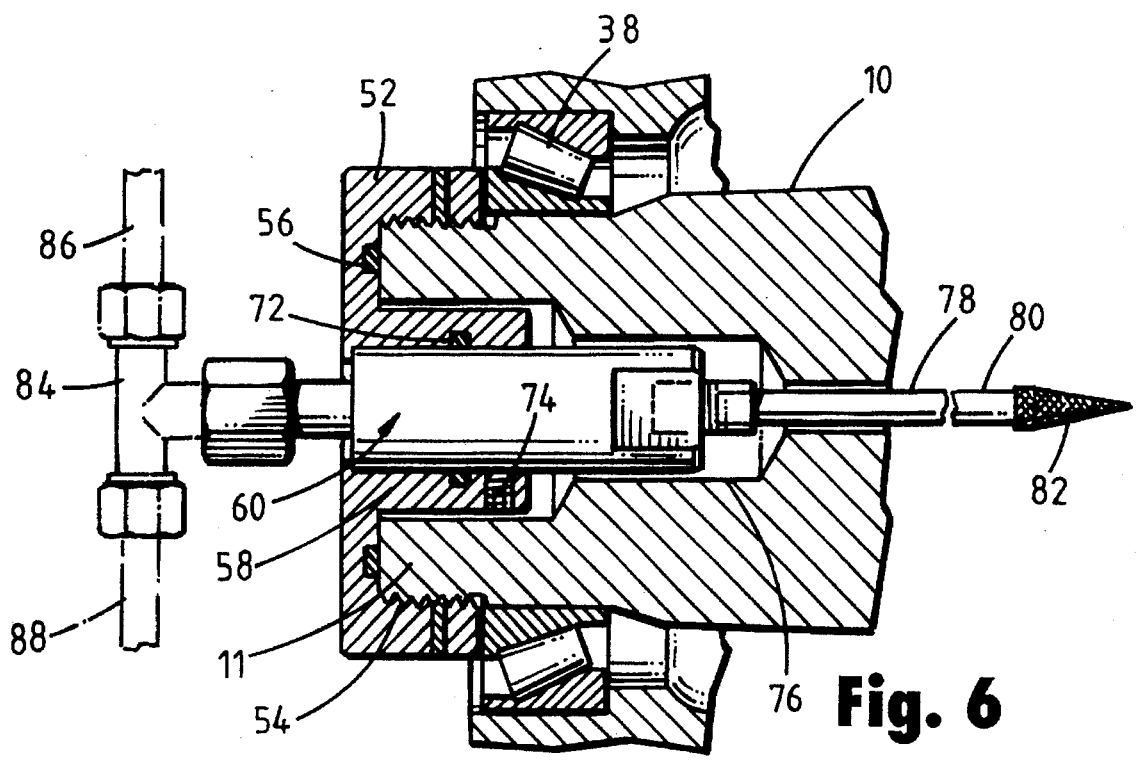
FIG. 6 is an enlarged elevational view, in cross section, of the air control system shown in FIG. 5.

In the present air control system, the air supply line 16 is connected between the vehicle air supply and the interior 50 of the axle for supplying air and pressurizing the inside 50 of the axle 10 with air. Thus, the interior 50 of the axle acts as the conduit for supplying air to the wheels 12 and 14 and eliminates the need for an axially extending conduit within the axle 10 which is subjected to vibration and damage. Referring now to FIGS. 5, 6 and 7, an air sealing barrier 52 is sealingly connected adjacent to each end of the axle 10 and is positioned between the lubrication compartment formed by the elements 18–32 (FIG. 4) and the air in the interior 50 for sealing the pressurized air inside the axle 10 between the barriers. Thus, the barrier 52 may be a threaded nut which threadably engages, by coacting threads 54, the axle 10 or spindle 11 thereof and forms a seal with the axle 10, such as by O-ring seal 56. The threaded nut 52 may incorporate an integral circular collar 58 for supporting a pneumatic rotary union 60.

Referring to FIGS. 6, 7 and 8, the pneumatic rotary union 60 has an air passageway 62 therethrough. The union 60 includes a first stationary part 64 and a second rotatable part 66, each of which is adapted to receive an air connection. The parts 64 and 66 are rotatable relative to each other through bearings 68 and are sealable relative to each other by a seal 70. The first stationary part 64 is sealingly secured in the circular collar 58 by a seal such as O-ring 72 and is secured therein such as by a set screw 74.

The passageway 62 of the rotatable pipe union 60 is in communication with the inside 50 of the axle 10 and thus receives the air supply from the air supply lines 16. Various types of axles 10 have different types of interiors. Some types of axles and spindles 11 are entirely hollow, while in other types of axles, as shown in FIG. 6, may have ends which are solid and require drilling a cavity 76 therein to receive the rotary union 60. While the passageway 62 may be directly connected to the inside 50 of the axle 10, it is desirable to provide a nipple 78 threadably connected to the stationary part 64 of the rotary union 60 and extending into the inside 50 of the axle 10. Preferably, the nipple 78 includes a free or unsupported end 80 and a filter 82. The filter 82 filters the incoming air supply and prevents any of the air passages in the rotary union 60 or downstream thereof from being blocked by particles in the air supply. Vibration of the free end 80 vibrates the filter 82 and insures its periodic cleaning.

Referring now to FIGS. 1, 4 and 5, other components of the air connection from the supply line 16 to the tires 12 and 14 and particularly from the rotary union 60 to the tires 12 and 14 is best seen. Thus, a male T 84 is connected to the rotary part 66 of the rotary union 60 and includes air hoses 86 and 88 which are connected through the hubcap extension 26 (FIG. 4) and are connected to quick disconnects 90 and 92 on the extension 26 and in turn to flex lines 94 and 96, respectively, connected to the air valve tires 12 and 14.

Figure 2:
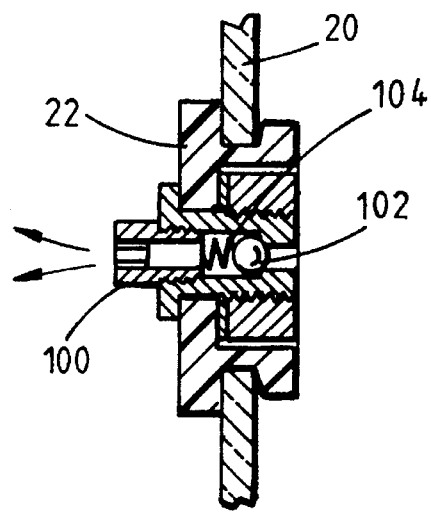
FIG. 2 is an enlarged fragmentary cross-sectional view of the oil plug of FIG. 1 having a relief valve.
Figure 3:
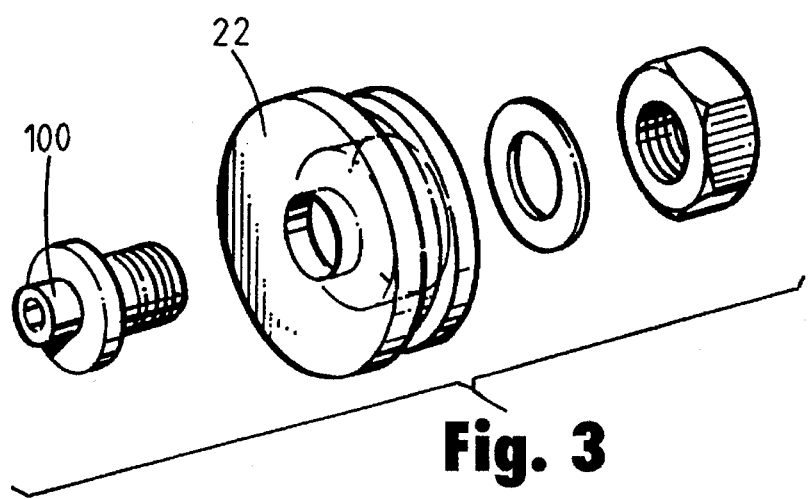
FIG. 3 is a perspective elevational exploded view of the oil plug and relief valve of FIG. 2.

However, as has been mentioned the pressure in the air connection may be 110 psi while the pressure in the lubrication compartment may be less than 3 psi. In the event that there is an inadvertent leak in the air connection that is transmitted to the lubrication compartment, the oil plug 22 will be blown out and disengaged from the sight glass 20 allowing the lubrication in the lubrication compartment to be lost with a consequent damage. Therefore, as best seen in FIGS. 1–3, a relief valve 100 may be provided in the oil plug 22 having a spring-loaded valve element 102 urged to a normally closed position by a spring 104 which will maintain the lubrication compartment closed but which will relieve pressure above 3 psi in the event of an air leak. The valve 100 is capable of exhausting a high volume of air, but is positioned above the normal lubricant fluid level to maintain sufficient lubricating fluid therein.

Other and further embodiments may be provided, as hereinafter described, wherein like parts to those shown in FIGS. 1–8 will be similarly numbered with the addition of the suffix "a".

Figure 9:
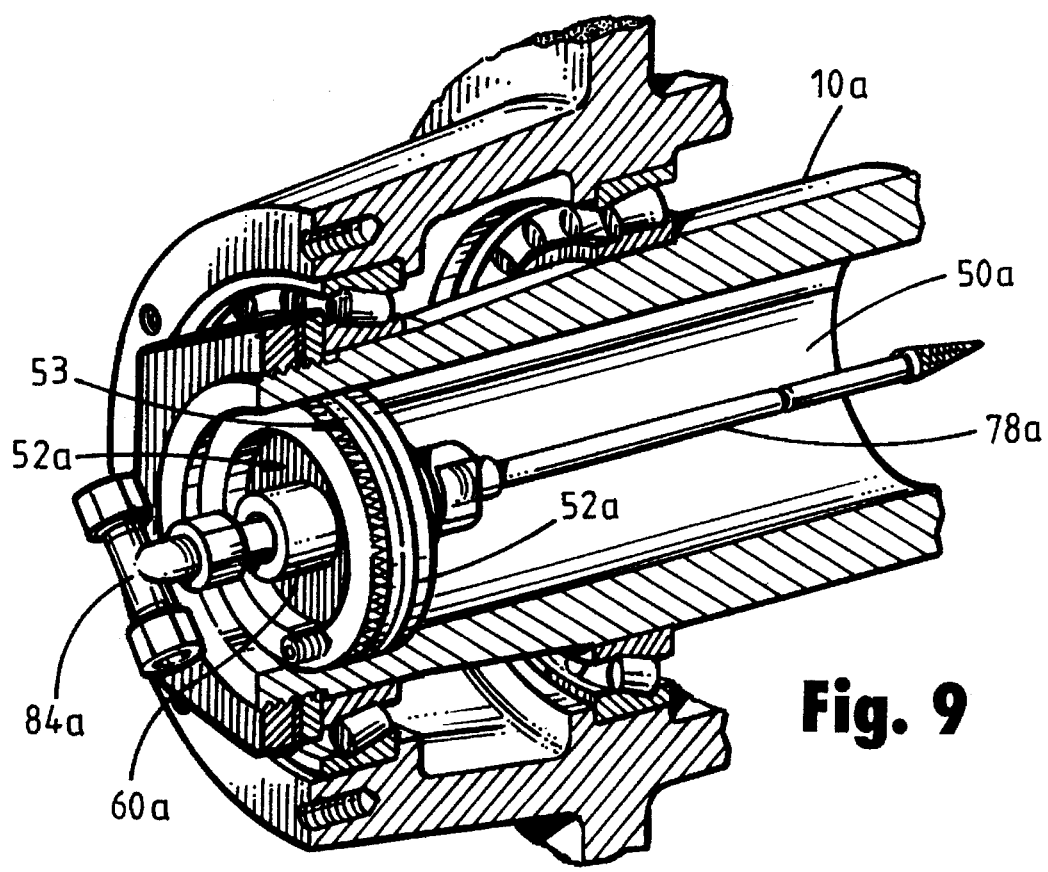
FIG. 9 is a fragmentary perspective elevational view of another embodiment of the present invention.
Figure 10:
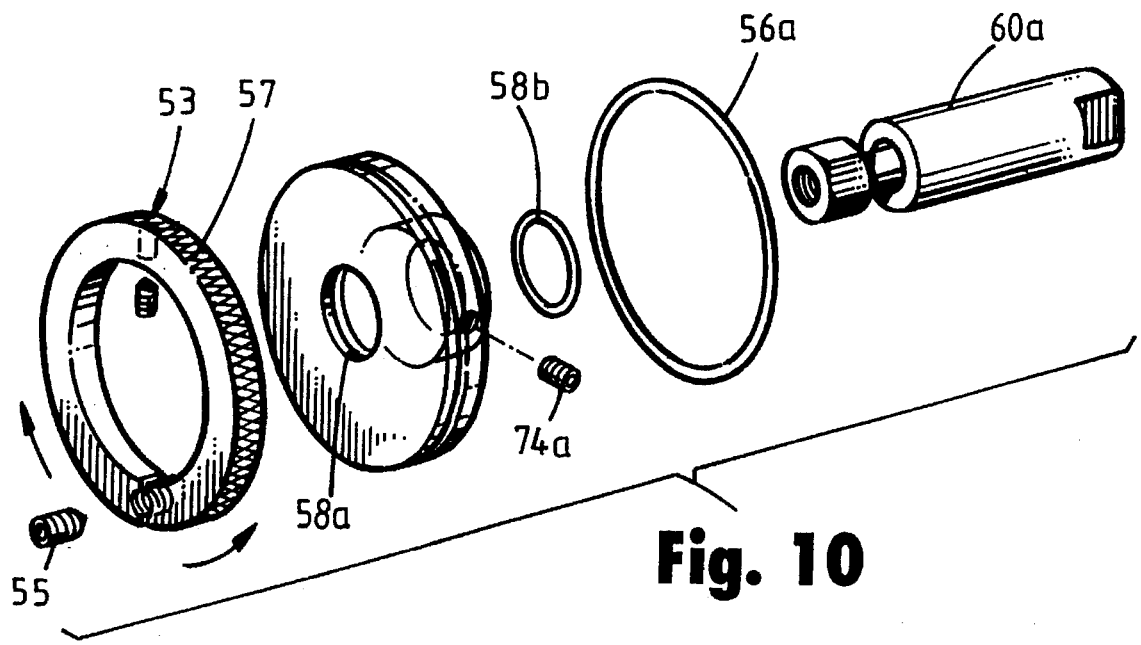
FIG. 10 is an exploded perspective elevational view of the portion of the air connection system shown in FIG. 9.

Referring now to FIGS. 9 and 10, another type of axle 10a is shown having a hollow interior 50a in which the air sealing barrier 52a consists of a disk or circular seal assembly having a sealing ring 56a around its outside for sealing against the inside of the axle 10a. The disk 52a includes a circular opening 58a for sealingly receiving a pneumatic rotary union 60a. The seal assembly 52a is inserted into the inside 50a of the air filled axle 10a. The disk 52a is secured against movement outwardly from the end of the axle by an expandable retainer 53 which is expanded by a screw 55 with a tapered thread to grip the inside of the axle 50. Air on the inside of the axle 50a will act on the disk 52a to prevent its movement inwardly.

The expandable retainer ring 53 may include a knurled surface on the outside surface 57 which provides optimum gripping force when installed in the axle 50a. The ring 53 is slotted allowing it to expand in the axle 50a. The rotary union 60a is sealed in the disk 52a by O-ring 58a and secured by a set screw 74a.

The present invention, therefore, is well adapted to carry out the objects and attain the ends and advantages mentioned as well as others inherent therein. While presently preferred embodiments of the invention have been given for the purpose of disclosure, numerous changes in the details of construction and arrangement of parts will be readily apparent to those skilled in the art and which are encompassed within the spirit of the invention and the scope of the appended claims.

What is claimed is:

1. An air inflation system for a trailer having at least one axle with at least one wheel having a pneumatic tire at each end of the axle and said trailer having an air supply and a lubrication compartment at each end of the axle for lubricating the wheel bearings comprising, an air conduit between the air supply and the axle supplying air and pressurizing the inside of the axle with air, a stationary air sealing barrier sealingly connected adjacent each end of the axle and positioned between the lubrication compartments and the air in the axle for sealing the air inside the axle between said barriers, a pneumatic rotary union supported and positioned in the center of each barrier and having an air passageway extending therethrough and in communication with the air inside of the axle, said union having a first stationary part and a second rotatable part sealingly rotatable relative to each other, said first stationary part sealingly secured to the barrier, and the second rotatable part positioned exposed to the lubrication compartment, a rotatable air connection connected between the second rotatable part and the tires and extending through the lubrication compartment, and a removable oil sight plug having a relief valve, said relief valve axially connected to each lubrication compartment, and said relief valve being biased to a normally closed position for retaining lubrication in the compartment, but said valve being opened if subjected to a predetermined air pressure in the lubrication compartment.

2. The apparatus of claim 1 including, a hollow nipple connected to the stationary part and in communication with the air passageway and extending into the axle, said nipple having a free end, and an air filter connected to the free end.

3. The apparatus of claim 2 wherein the free end is unsupported and free to vibrate.

4. The apparatus of claim 1 wherein the air sealing barrier is a threaded nut screwed on the axle and includes a circular collar for receiving the pipe union, and said collar includes a set screw for securing the pipe union to the collar.

5. The apparatus of claim 1 wherein the air sealing barrier is a circular seal assembly positioned inside the axle, and an expandable retainer ring positioned adjacent the wall for gripping the inside of the axle for holding the seal assembly in the axle.

* * * * *